(12) United States Patent
Gow (10) Patent No.: US 10,987,876 B2
(45) Date of Patent: Apr. 27, 2021

(54) JOINING COMPONENTS

(71) Applicant: AIRBUS OPERATIONS LIMITED, Bristol (GB)

(72) Inventor: Piers Gow, Bristol (GB)

(73) Assignee: Airbus Operations Limited, Bristol (GB)

( * ) Notice: Subject to any disclaimer, the term of this patent is extended or adjusted under 35 U.S.C. 154(b) by 157 days.

(21) Appl. No.: 16/182,022

(22) Filed: Nov. 6, 2018

(65) Prior Publication Data

US 2019/0134923 A1 May 9, 2019

(30) Foreign Application Priority Data

Nov. 8, 2017 (GB) ..................................... 1718438

(51) Int. Cl.
*B29C 65/56* (2006.01)
*B33Y 80/00* (2015.01)
(Continued)

(52) U.S. Cl.
CPC .......... *B29C 65/562* (2013.01); *B29C 65/561* (2013.01); *B29C 65/564* (2013.01); *B29C 65/603* (2013.01); *B29C 65/64* (2013.01); *B29C 65/7855* (2013.01); *B29C 66/02242* (2013.01); *B29C 66/1122* (2013.01); *B29C 66/30321* (2013.01); *B29C 66/30341* (2013.01); *B29C 66/41* (2013.01); *B29C 66/474* (2013.01); *B29C 66/721* (2013.01); *B29C 66/742* (2013.01); *B33Y 80/00* (2014.12); *B29C 64/10* (2017.08); *B29C 65/608* (2013.01);
(Continued)

(58) Field of Classification Search
CPC ... B29C 65/564; B29C 65/562; B29C 65/603; B29C 65/64; B29C 65/608; B29C 65/606; B29C 65/7855; B29C 66/02242; B29C 66/30321; B29C 66/721; B29C 66/41; B29C 66/742; B33Y 80/00; B29L 2031/3082
See application file for complete search history.

(56) References Cited

U.S. PATENT DOCUMENTS

2007/0261224 A1* 11/2007 McLeod ............. B29C 37/0082
                                                                                 29/428
2008/0003401 A1* 1/2008 Barnes ................ B29C 66/1122
                                                                                428/99

(Continued)

FOREIGN PATENT DOCUMENTS

WO      2008/110835      9/2008
WO      2010122325      10/2010
(Continued)

*Primary Examiner* — Jermie E Cozart
(74) *Attorney, Agent, or Firm* — Nixon & Vanderhye P.C.

(57) ABSTRACT

A method for joining a first component and a second component. The method includes forming a first bond between the first component and the second component by providing a plurality of projections on the first component and embedding the plurality of projections in the second component; creating a fastener hole which passes through the first component and the second component and which encompasses at least one of the projections; and forming a second bond between the first component and the second component by installing a fastener in the fastener hole.

13 Claims, 6 Drawing Sheets

(51) Int. Cl.
  *B29C 65/78* (2006.01)
  *B29C 65/64* (2006.01)
  *B29C 65/60* (2006.01)
  *B29L 31/30* (2006.01)
  *B29C 64/10* (2017.01)
  *B29C 65/00* (2006.01)
  *B33Y 10/00* (2015.01)

(52) U.S. Cl.
  CPC .... *B29C 66/7212* (2013.01); *B29C 66/72141* (2013.01); *B29C 66/7422* (2013.01); *B29C 66/7428* (2013.01); *B29C 2793/009* (2013.01); *B29C 2793/0045* (2013.01); *B29C 2793/0081* (2013.01); *B29L 2031/3076* (2013.01); *B29L 2031/3082* (2013.01); *B33Y 10/00* (2014.12)

(56) References Cited

U.S. PATENT DOCUMENTS

| | | |
|---|---|---|
| 2010/0247869 A1 | 9/2010 | Meyer et al. |
| 2010/0320320 A1 | 12/2010 | Kismarton |
| 2012/0045613 A1* | 2/2012 | Sanderson .......... B29C 66/7394 428/137 |
| 2015/0343742 A1 | 12/2015 | Roemer |

FOREIGN PATENT DOCUMENTS

| | | |
|---|---|---|
| WO | 2011/069899 | 6/2011 |
| WO | 2014075198 | 5/2014 |
| WO | 2016/071335 | 5/2016 |

* cited by examiner

JOINING COMPONENTS

RELATED APPLICATION

This application claims priority to United Kingdom Patent Application GB 1718438.3, filed Nov. 8, 2017, the entire contents of each of which is incorporated by reference.

TECHNICAL FIELD

The present invention relates to a method of joining a first component to a second component, and also relates to a component and a subcomponent suitable for use with the method.

BACKGROUND

The use of fasteners to join metallic or thermoplastic components to composite components is commonplace. To join a metallic (or thermoplastic) part to a composite part using fasteners the metallic part is positioned against the composite part and clamped in position, then fastener holes are drilled and the fasteners are inserted. The clamping pressure required to prevent drill breakout and burring in the stack can be complex to implement, and time consuming.

WO 2008/110835 A1 describes an alternative joining method for joining a composite component to a non-composite component. Surface features (which may be known as proggles) are "grown" on a bond surface of the non-composite component in a series of layers by an additive fabrication process. Each proggle may have a pointed tip such that the surface features may easily be embedded into a series of laminate plies draped successively over the bond surface. Those plies become incorporated into the composite component. The proggles are thereby embedded inside the composite component and resist separation of the composite and non-composite components.

SUMMARY

A first aspect of the present invention provides a method for joining a first component and a second component. The method comprises forming a first bond between the first component and the second component by providing a plurality of projections on the first component and embedding the plurality of projections in the second component. The method further comprises creating a fastener hole which passes through the first component and the second component and which encompasses at least one of the projections. The method additionally comprises forming a second bond between the first component and the second component by installing a fastener in the fastener hole.

Optionally, the plurality of projections comprises a first array of one or more projections provided on a first region of the first component and a second array of one or more projections provided on a second region of the first component.

Optionally, the location of each of the first region and the second region corresponds to an intended fastener location for fastening the first component to the second component.

Optionally, each of the first region and the second region is circular, and the diameter of the first region is less than or equal to the diameter of a first fastener hole intended to be created at the location of the first region and the diameter of the second region is less than or equal to the diameter of a second fastener hole intended to be created at the location of the second region.

Optionally, the fastener hole encompasses the first array of one or more projections, such that the first array of one or more projections is entirely removed by the creation of the fastener hole.

Optionally, the method further comprises creating a further fastener hole which passes through the first component and the second component and which encompasses at least some of the projections not encompassed by the fastener hole. Optionally the second bond is formed additionally by installing a further fastener into the further fastener hole.

Optionally, the further fastener hole encompasses the second array of one or more projections, such that the second array of one or more projections is entirely removed by the creation of the further fastener hole.

Optionally, the fastener hole is a pilot hole having a diameter smaller than the diameter of a final fastener hole intended to be created at the same location as the pilot hole. Optionally, the fastener is a temporary fastener.

Optionally, the second component comprises a composite material, and embedding the plurality of projections into the second component comprises penetrating the plurality of projections into the second component in a pre-cured state of the second component, and subsequently curing the second component.

Optionally, the at least one projection encompassed by the fastener hole is comprised in a subcomponent, and providing a plurality of projections on the first component comprises arranging the subcomponent on the first component.

Optionally, the fastener hole encompasses the subcomponent, such that the subcomponent is entirely removed by the creation of the fastener hole.

Optionally, the subcomponent comprises a head and a shaft, wherein the at least one projection is on an end of the shaft distal from the head, and when the subcomponent is arranged on the first component the shaft extends through a hole in the first component such that the head is adjacent one side of the hole and the at least one projection extends from an opposite side of the hole.

Optionally, forming the first bond between the first component and the second component comprises arranging the second component adjacent to the hole in the first component; and inserting the shaft of the subcomponent into the hole in the first component such that the at least one projection on the subcomponent penetrates the second component.

Optionally, the subcomponent comprises a different material to the first component. Optionally, the subcomponent is formed by an additive manufacturing process and the first component is not formed by an additive manufacturing process. Optionally, the plurality of projections is formed by an additive manufacturing process.

Optionally, the first and second components are aircraft components.

A second aspect of the invention provides a component for joining to a further component. The component comprises multiple arrays of one or more projections. Each array of one or more projections extends from a predefined region of an interface surface of the component. The shape and location of each predefined region corresponds to the shape and location of a fastener hole intended to be created to join the component to the further component.

Optionally, each predefined region is configured to be encompassed by the corresponding fastener hole, such that the array of one or more projections on a given predefined region will be removed by the creation of the corresponding fastener hole.

Optionally, each array of one or more projections is comprised in a different subcomponent of the component, wherein either or both of the material and the method of manufacture is different as between the component and the subcomponents.

Optionally, the component is a component of an aircraft wing.

Optionally, the component is a first component according to the first aspect.

A third aspect of the invention provides a subcomponent for joining a first component to a second component. The subcomponent comprises a shaft having a head at one end and at least one projection extending from the other end.

Optionally, the size and shape of the head is such that the head is encompassable by a fastener hole for a fastener intended to be used to join the first component to the second component.

Optionally, the subcomponent is formed by an additive manufacturing process.

Optionally, the subcomponent is a subcomponent according to the first aspect.

BRIEF DESCRIPTION OF THE DRAWINGS

Embodiments of the invention will now be described, by way of example only, with reference to the accompanying drawings, in which:

FIG. 1b is a schematic cross-section through the example first component of FIG. 1a;

FIG. 1c shows a non-exhaustive selection of three different example arrays of projections suitable for the example first component of FIG. 1a;

FIG. 1d is a perspective view of the example first component of FIG. 1a;

DETAILED DESCRIPTION

The examples described below relate to joining a first component and a second component. In each described example a first bond is formed between the first component and the second component by providing a plurality of projections on the first component and embedding the plurality of projections in the second component. A fastener hole is then created, which passes through the first component and the second component and which encompasses at least some of the projections. Then, a second bond is formed between the first component and the second component by installing a fastener in the fastener hole.

Creating a first bond in this manner serves to hold the first component and the second component together in the correct configuration whilst the second bond is formed, thus reducing or eliminating the need to clamp the first component and the second component together. Clamping can be a difficult and time-consuming process, so eliminating clamping from the joining process can significantly reduce build times. Moreover, the first component and the second component may be positioned more accurately than is possible using clamps, improving the build quality of the joined part.

The invention may be particularly advantageous in examples where the second component is formed of a composite material, such as CFRP. In such examples the projections of the first component may be inserted into the composite material before it is cured, and become fixedly embedded by the curing of the composite material.

Figure 1A:
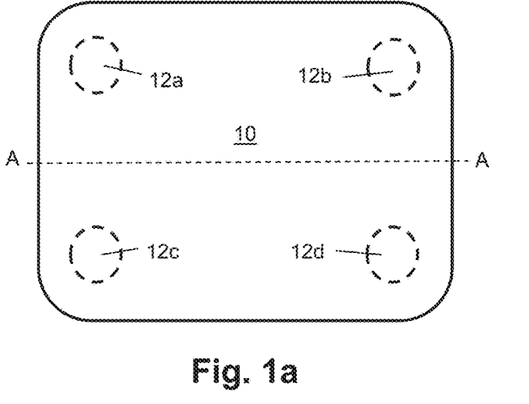
FIG. 1a is a schematic plan view of an example first component for joining to a second component according to the invention.
Figure 1B:
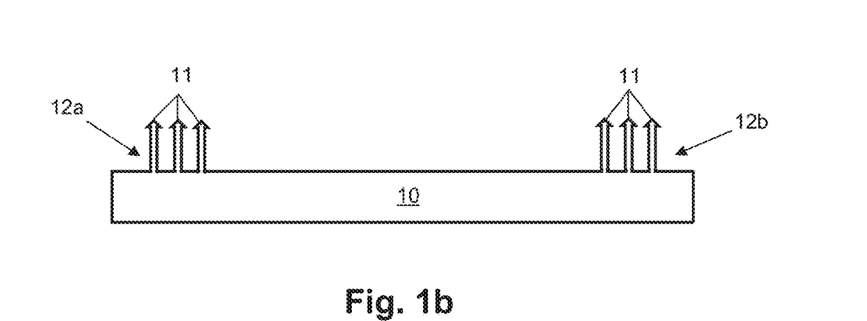
Figure 1C:
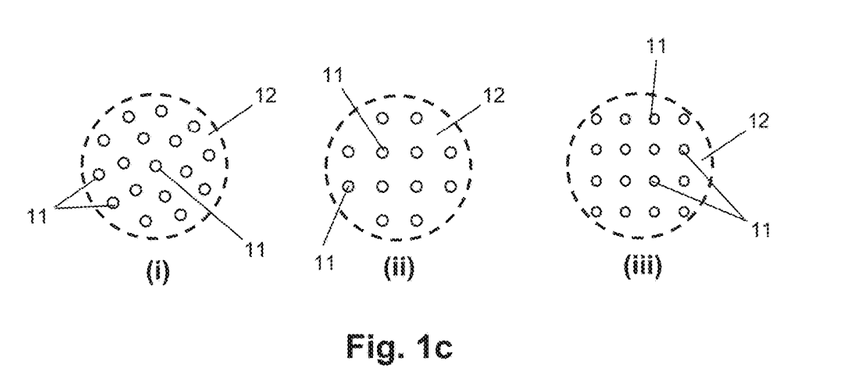
Figure 1D:
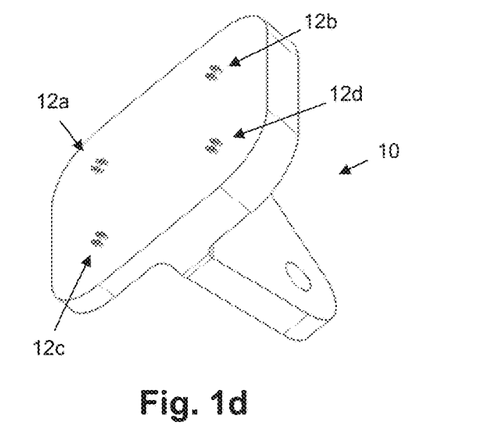

FIGS. 1a-d show an example first component 10 according to the invention. The first component may in principle be any type of component. FIG. 1d illustrates a particular example in which the first component 10 is a bracket. The first component 10 is configured to be joined to a second component. FIG. 1a shows the first component 10 in plan view, and FIG. 1b is a cross-section through the first component 10 along the line A-A. The first component comprises a plurality of projections 11, which extend outwardly from a surface of the first component which is configured to abut a surface of the second component when the first component is joined to the second component. In the illustrated example the projections extend substantially perpendicularly to the surface, but in other examples the projections may be angled with respect to the surface. Each projection 11 comprises a head configured to resist separation of the first and second components when the projections are embedded in the second component, whilst facilitating insertion of the projections into the second component. For example, the head may be barbed or hooked. In the illustrated example each projection 11 has an arrow-shaped head.

The plurality of projections 11 provided on the first component 10 comprises four separate arrays of projections, each of which is provided on a respective separate region (projection region) 12a-d of the first component 10. In other examples a different number of arrays of projections may be provided. Moreover, alternative examples are contemplated in which one or more projection regions on a component comprises only a single projection. The term "array" as used in the following description should be interpreted as including such single element "arrays". The location of each region 12a-d corresponds to an intended fastener location for fastening the first component 10 to the second component. The fastener locations may be selected in a conventional manner. In other words, the fastener locations may be the same as if the first and second components were being joined using a known process of clamping and fastening, rather than a joining method according to the invention. The fastener locations, and therefore the locations of the regions 12a-d, may be selected based on any relevant considerations, and will depend on the particular type and application of the first and second components.

The shape and size of each region 12a-d may similarly correspond to the shape and size of a fastener hole intended to be created at the corresponding location. In the illustrated example, each region 12a-d is substantially equal in shape and size to a fastener hole intended to be created at the corresponding location. In the illustrated example, each of the regions 12a-d is circular, and the diameter of each region 12a-12d is substantially equal to the diameter of a fastener hole intended to be created at the corresponding region. In some examples the diameter of each region 12a-d may be less than the diameter of a fastener hole intended to be created at the corresponding region. Alternative examples are possible in which a region is shaped differently to its corresponding fastener hole.

Although in the illustrated example all of the regions 12a-12d are the same shape and size, this need not necessarily be the case. Depending on the nature of the first component 10 and or the second component, it may be intended to use more than one type of fastener to form the second bond between the first component 10 and the second component. For example, it may be intended to install relatively larger fasteners at the locations of regions 12a and 12b, and relatively smaller fasteners at the locations of regions 12c and 12d. In such examples the regions 12a and 12b will be relatively larger (substantially equal to the size of the corresponding fastener holes, which are configured to accommodate the relatively larger fasteners) and the regions 12c and 12d will be relatively smaller (substantially equal to the size of the corresponding fastener holes, which are configured to accommodate the relatively smaller fasteners).

Preferably, the regions 12a-d are configured such that each region is encompassed by its corresponding fastener hole, such that the array of projections 11 on a given region is entirely removed by the creation of the corresponding fastener hole. This has the effect that the projections 11 (and the immediately surrounding part of the first and second components 10, 20) are not present in the joined part. Removing the region containing the projections 11 may be advantageous for several reasons, which will become apparent from the following description.

The number and arrangement of projections 11 within a given region 12a-d may be selected depending on the requirements of the particular application. Relevant considerations may include, for example, the desired strength of the first bond formed by the embedded projections, the material type of the first component, the material type of the second component, the size of the region containing the projections, the shape and size of each projection, and the like. The spacing between adjacent projections 11 may be larger than a largest cross-sectional dimension of the projections 11. It is expected that typically each projection 11 in a given region 12a-d will have a substantially identical cross-section, although this need not necessarily be the case. In examples in which circular cross-section projections 11 of equal diameter are provided in a given region 12a-d (such as the example illustrated by FIGS. 1a-c), preferably the spacing between adjacent projections 11 in that region is at least twice the diameter of the projections 11. The spacing between adjacent projections 11 in a given region 12a-d may be at least the diameter of the projections. It may be advantageous for the spacing between adjacent projections 11 in the given region 12a-d to be at least three times the diameter of the projections. The diameter of the projections 11 may be selected according to the particular requirements of a given application.

Various options are envisaged for how projections 11 could be arranged within a given projection region 12a-d. FIG. 1c shows three different options (i)-(iii) for how the projections 11 could be arranged within one of the regions 12a-d of the component 10. In (i) the projections are arranged in concentric circles, with a single central projection. In (ii) the projections are arranged in a grid having a relatively larger spacing. In (iii) the projections are arranged in a square grid having a relatively smaller spacing. In principle, any possible alternative arrangement of projections 11 could be used, depending on the particular requirements of a given application. Such alternative arrangements include, but are not limited to: a single projection; a single circle of projections, a line of projections.

Figure 2A:
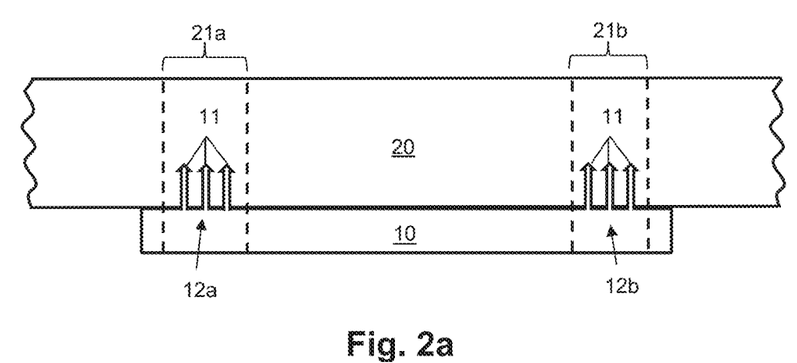
FIG. 2a is a schematic cross-section through an example first component joined to an example second component by a first bond.

FIG. 2a shows the first component 10 joined by a first bond to an example second component 20. The projections 11 are embedded in the second component 20. Embedding the projections 11 in the second component 20 may be achieved by any suitable method, which will depend on the material type of the first component 10 and of the second component 20. For example, the first component 10 may be formed from a relatively harder material and the second component 20 may be formed from a relatively softer material. Alternatively, the second component 20 may be formed around the projections 11 using any suitable technique. In the particular example, the first component 10 is formed from a metallic material (e.g. aluminium or titanium), and the second component 20 is formed from a composite material (e.g. CFRP, glass fibre reinforced polymer (GFRP), aramid fibre (Kevlar), a sandwich composite material, a monolithic composite material, or the like). In other examples the first component need not be formed from a metallic material but could instead be formed from a plastics material, nylon, or the like. The projections 11 are inserted into the second component 20 when the second component 20 is in an uncured or semi-cured state (that is, a state in which the second component 20 is soft enough to easily receive the projections 11). The projections 11 pass between the fibres of the composite material. The second component 20 is then cured whilst joined to (or at least supported in the joined configuration) the first component 10. As a result of the curing of the second component 20, the projections 11 become securely embedded in the second component 20.

Curing of the composite material may be performed using any suitable technique appropriate to the particular material and the intended application of the second component 20. It will be appreciated that curing a composite material sometimes requires it to be heated. Thermal expansion depends upon the thermal expansion coefficient, length of the part, and the delta temperature. The first component 10 may be formed from a material having different thermal expansion behaviour to the composite material of the second component 20. The projections 11 are, in this example, configured such that they are able to withstand the stresses imposed upon them by the difference in thermal expansion between the first component 10 and the second component 20. For example, it has been found that an aluminium first component 10 of size 60 mm×120 mm having projection regions in a 2×4 pattern, embedded inside a CFRP second component 20 can withstand the thermal stresses induced by a delta temperature of 160 degrees Celsius. Greater delta temperatures, different size first components, and different projection arrays are also feasible.

Figure 2B:
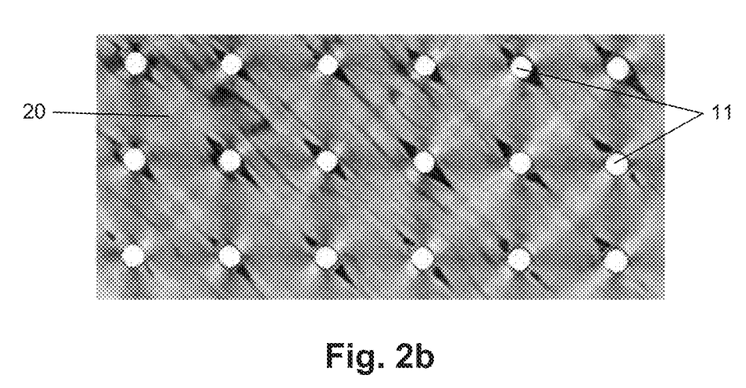
FIG. 2b shows deformations in an example second component caused by the embedded projections of an example first component.

FIG. 2b is a plan view of an example composite second component 20, with the projections 11 of the first component 10 embedded into the composite material (the rest of the first component 10 is omitted, so that the projections 11 are visible). It can be seen that the fibres of the composite material deform around the projections 11. This reduces the strength of the composite material in the area immediately surrounding the projections 11. As such, it may be advantageous to configure the projection regions 12a-d such that there is sufficient margin between the outermost projections 11 and the edge of the corresponding fastener hole that the deformations caused by the projections 11 are removed by the creation of the fastener hole. It will be appreciated that the size of the deformations will depend on the particular type of composite material, as well as on the size and arrangement of the projections 11.

The dashed lines in FIG. 2a indicate the edges of the fastener holes 21a, 21b intended to be created at the locations of the projection regions 12a, 12b respectively. The distance between the edge of each fastener hole 21a, 21b and the outermost projections of the corresponding projection region 12a, 12b is larger than the extent of the deformations caused by the projections 11. The distance between the between the edge of each fastener hole 21a, 21b and the outermost projections 11 of the corresponding projection region 12a, 12b may be at least half the diameter of the projections 11. In some examples the distance between the between the edge of each fastener hole 21a, 21b and the outermost projections 11 of the corresponding projection region 12a, 12b may be at least twice the diameter of the projections 11.

Figure 3:
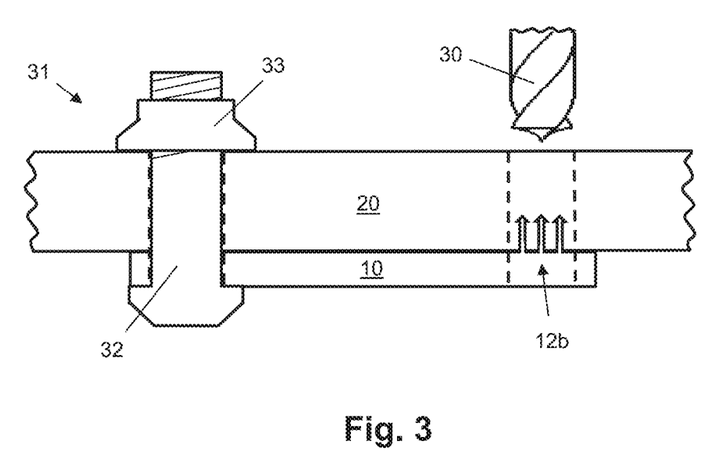
FIG. 3 is a schematic cross-section through an example first component joined to an example second component by a first bond and a second bond.

FIG. 3 illustrates the formation of the second bond between the first component 10 and the second component 20. In the location of the projection region 12a, a first fastener hole has been created (in the illustrated example the first fastener hole has been created by drilling with drill bit 30, although any suitable technique could be used depending on the shape of the fastener hole and the materials of the first and second components). A first fastener 31 comprising a bolt 32 and a nut 33 has been installed into the first fastener hole, and is providing a clamping force to join the first and second components 10, 20. Although a nut and bolt type fastener is shown in this example, in principle any type of fastener (including single-sided fasteners) which is installable into a hole through two (or more) components to be joined could be used. In some examples the fastener 31 may be a temporary fastener, which is intended to be replaced by a final fastener. In such examples the fastener hole into which the temporary fastener is installed may be a pilot hole, which may have a smaller diameter than a final hole to be drilled at the same location at a later time. Although the particular example shows the fastener being installed such that the head is adjacent the first component 10, equally the fastener could be installed in an opposite orientation such that the head is adjacent the second component 20.

The fastener hole corresponding to the projection region 12b has not yet been created. As such, the projections 11 in the projection region 12b maintain the first bond during the process of drilling the first fastener hole and installing the first fastener 31. After the first fastener 31 has been installed, a second fastener hole can be created in the location of the projection region 12b, and a second fastener installed. During the process of creating the second fastener hole and installing the second fastener, the first and second components 10, 20 are held together in the joined configuration by the first fastener 31.

The preceding description has assumed that the projections are formed integrally with the first component 10. This can be achieved, for example, by using an additive manufacturing process to form the first component 10, or by using friction stir welding or spot welding to join the projections to the main body of the first component 10, or by machining the first component 10. However, there exist components which it is currently not possible or practicable to form using any of these techniques, for example because they are too large, too complex, or must be formed from a material unsuitable for additive manufacturing, welding or machining. Moreover, for certain applications it may be undesirable for the joined part to contain a component that has been formed by an additive manufacturing process (e.g. because of aerospace certification requirements). Some examples of the invention therefore provide the projections on one or more subcomponents of the first component 10, which may be manufactured separately to the main body of the first component 10.

Figure 4:
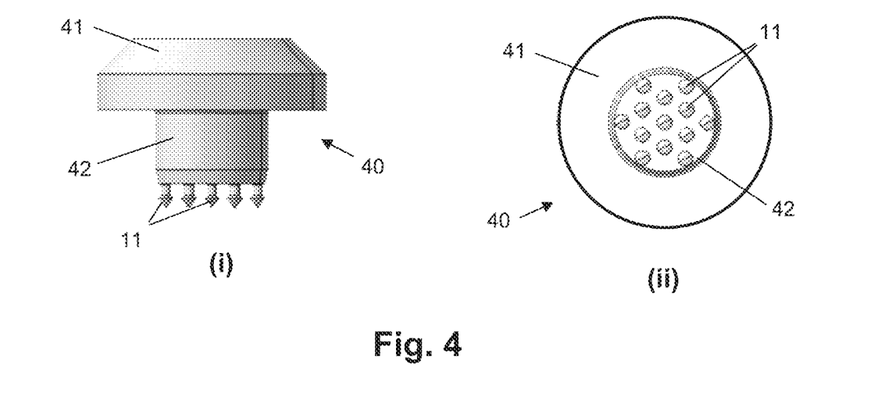
FIG. 4 shows a side view and a bottom view of an example subcomponent according to the invention.
Figure 5:
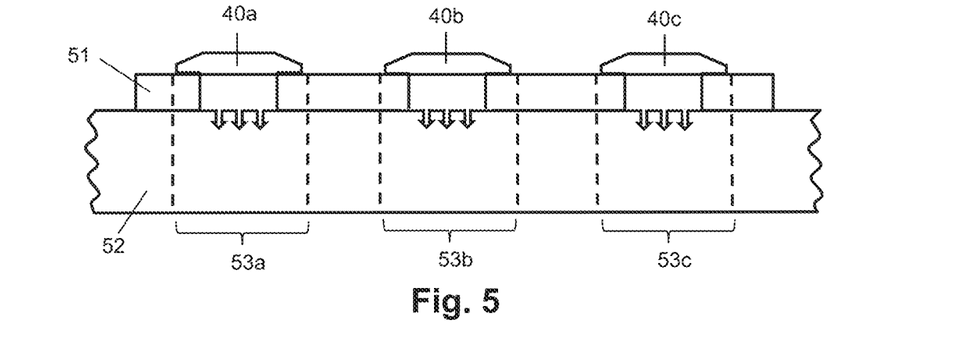
FIG. 5 is a schematic cross-section through an example first component comprising three example subcomponents, joined to an example second component by a first bond.

FIGS. 4 and 5 illustrate an example of the invention in which projections 11 are provided on a first component 51 by arranging at least one subcomponent 40, which comprises the projections 11 encompassed by a fastener hole intended to be created through the first component 51, on the first component 51.

FIG. 4 shows the subcomponent 40 in isolation. Part (i) shows a side view of the subcomponent 40, and part (ii) shows a bottom view. In the illustrated example the subcomponent 40 comprises a head 41 and a shaft 42, and the projections 11 are provided on an end of the shaft 42 distal from the head 41. However, in principle the subcomponent 40 can have any configuration suitable for cooperating with a first component to provide projections 11 on that first component. The illustrated subcomponent 40 is configured to be received within a hole in a first component. In particular, when the subcomponent 40 is arranged on the first component the shaft 42 extends through the hole in the first component such that the head 41 is adjacent one side of the hole and the projections 11 extend from an opposite side of the hole. The subcomponent 40 may be formed from any suitable material, which need not be the same as a material from which the first component is formed. In some examples the subcomponent 40 is formed using an additive manufacturing process. In such examples the first component may not be formed using an additive manufacturing process.

FIG. 5 shows an example first component 51 with three subcomponents 40a-c arranged on it. The subcomponents 40a-c are of the same type as the subcomponent 40 of FIG. 4. The first component 51 is joined to a second component 52 by a first bond, created by the projections of the subcomponents 40a-c being embedded in the second component 52. It can be seen that the head 41 of each subcomponent 40a-c acts to prevent separation of the first and second components 51, 52. Moreover, this effect is achieved even if the subcomponents 40a-c are not fixedly attached to the first component 51. In other examples the subcomponents 40a-c may be fixedly attached to the first component 51, in which case they need not have a head configured to resist separation of the first and second components 51, 52 when in the joined configuration. Attachment of the subcomponents 40a-c to the first component 51 may be achieved by any suitable mechanism, including but not limited to: an interference fit between a subcomponent 40a-c and a corresponding hole or recess in the first component 51; bonding a subcomponent 40a-c to the first component 51; welding a subcomponent 40a-c to the first component 51; providing interlocking formations on a subcomponent 40a-c and the first component 51.

The dashed lines on FIG. 5 indicate the edges of three fastener holes 53a-c intended to be created at the locations of the three subcomponents 40a-c. Each fastener hole 53a-c encompasses the corresponding subcomponent 40a-c, such that the subcomponent is entirely removed by the creation of the fastener hole. That is, none of the subcomponents 40a-c are present in the joined part. Advantageously, this permits considerable design freedom for the subcomponents 40*a-c*, because they do not need to be able to meet the operational requirements that apply to the joined part.

Figure 6:
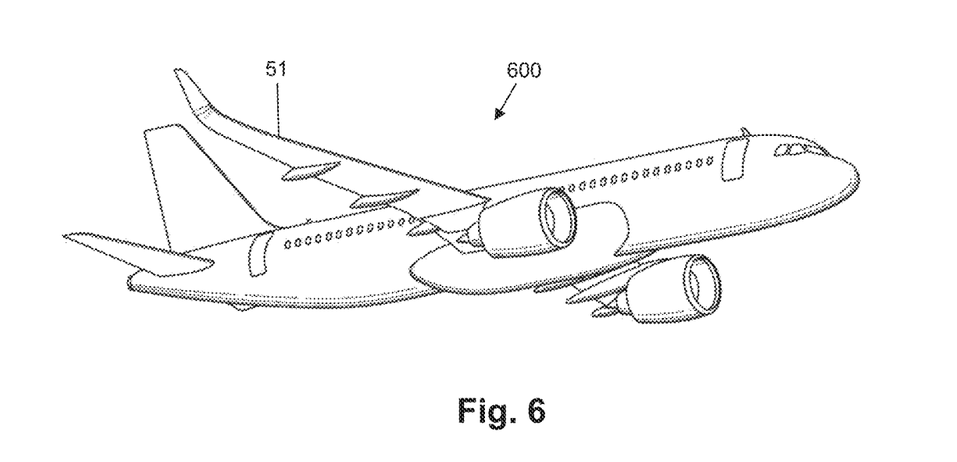
FIG. 6 is a schematic view of an example aircraft comprising a first component and a second component joined according to the invention.

FIG. 6 shows an example aircraft 600 comprising a joined part which has been manufactured using an example method according to the invention. The joined part comprises a first component and a second component which may have any of the features of the example first and second components described above. It will be appreciated that certain key features of the first and second components of the joined part (such as projections on the first component, and a region of the second component containing embedded projections) are not comprised in the aircraft 600, because they have been removed during manufacture of the joined part. The joined part may be, for example, a spar, a rib, a panel, a bracket, or indeed any aircraft component formed by joining two (or more) constituent parts. In some examples the joined part may be an aircraft component which mostly comprises a composite material.

Figure 7:
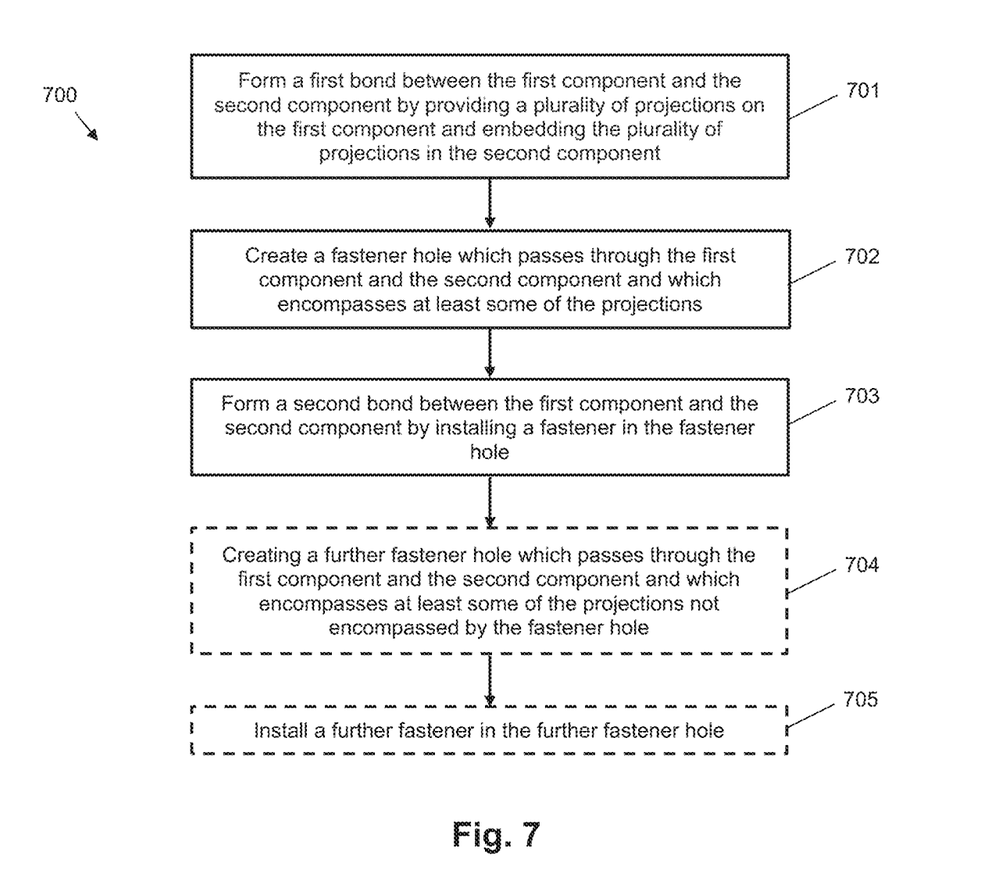
FIG. 7 is a flow chart illustrating an example method of joining a first component and a second component according to the invention.

FIG. 7 is a flow chart illustrating an example method 700 for joining a first component and a second component. The method is described in relation to a specific example illustrated by FIGS. 8*a-g*, which show three different first components 81*a-c* at various stages during a process of joining the first components 81*a-c* to a second component 82, but it is also applicable to the general examples described above. It should be appreciated that some or all of the particular features of the example of FIGS. 8*a-g* may differ in other examples according to the invention. A non-exhaustive list of such features is: configuration and material composition of the first component; configuration and material composition of the second component; number, configuration and arrangement of projections on the first component; number, arrangement and type of fasteners used to form the second bond.

In a first block 701, a first bond is formed between the first component and the second component. The first bond is formed by providing a plurality of projections on the first component and embedding the plurality of projections in the second component. The first and second components may have any of the features of the example first and second components described above in relation to FIGS. 1 to 6. A particular example implementation of block 701 is illustrated by FIGS. 8*a-d*.

Figure 8A:
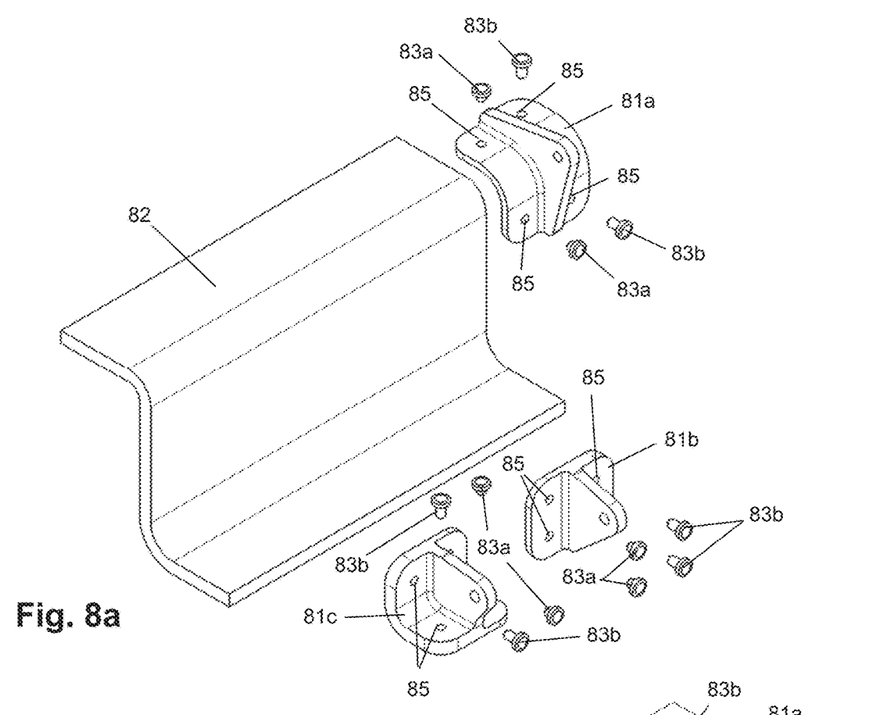
FIGS. 8a-g are schematic views of an example first component and an example second component at various stages of the example method of FIG. 7.
Figures 8B, 8C:
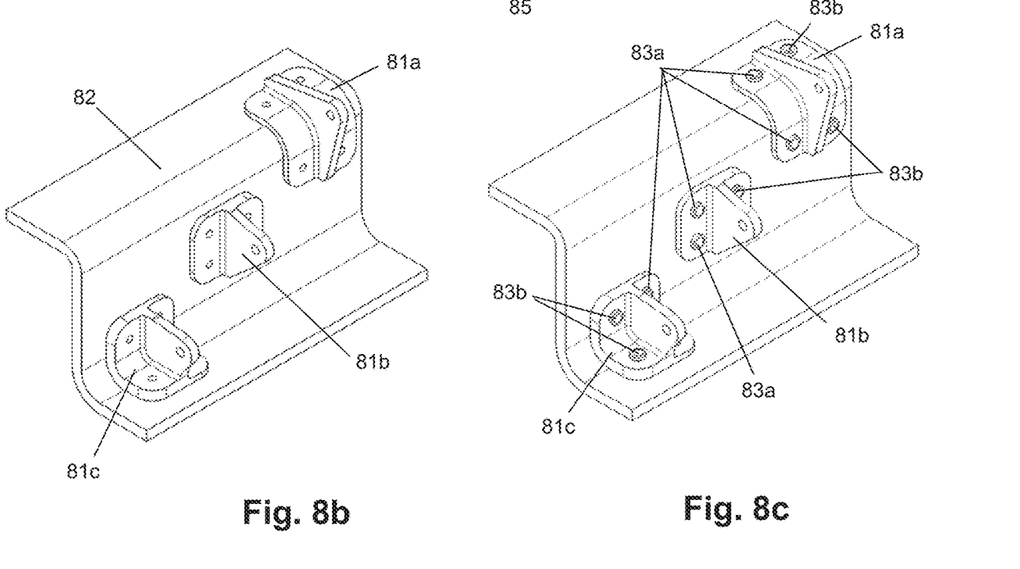

FIG. 8*a* shows three different example first components 81*a-c* which are to be joined to an example second component 82. Each of the first components 81*a-c* comprises a metallic fitting. The second component 82 comprises a Z-shaped beam formed from a composite material. The second component 82 may be, for example, an aircraft wing spar. First components 81*a* and 81*c* are shaped to correspond to the convex and concave curved parts of the second component 82 respectively. First component 81*b* has a flat surface configured to abut a flat surface of the second component 82. Each of the first components 81*a-c* is configured to be attached to the second component by four fasteners. In the pre-joining state of the first components as shown in FIGS. 8*a* and 8*b*, each first component 81*a-c* comprises a hole 85 at each of the intended fastener locations. However; the diameter of each of the holes 85 is smaller than the diameter required to receive the intended fasteners. Each of the first components 81*a-c* comprises a thicker half and a thinner half, separated by a projection. For each first component 81*a-c*, two intended fastener locations are on the thinner half and two intended fastener locations are on the thicker half.

Projections (not visible in FIGS. 8*a-c*) are provided on each of the first components 81*a-c* by arranging subcomponents 83*a*, 83*b* on the first components 81*a-c*. Each subcomponent 83*a*, 83*b* has the same general form and features as the example subcomponent 40 described above in relation to FIG. 4. The subcomponents 83*a*, 83*b* are provided on the first components 81*a-c* by inserting a shaft of each subcomponent 83*a*, 83*b* into one of the holes 50 (the subcomponent is selected to have a shaft length appropriate for the hole in which it is to be inserted), such that a head of each subcomponent 83*a* is adjacent one side of the hole and the projections on a distal end of the shaft extend from an opposite side of the hole. The shaft length of the subcomponents 83*b* is longer than the shaft length of the subcomponents 83*a*. This is because the subcomponents 83*b* are configured to be inserted into holes 50 which extend through the thicker halves of the first components 81*a-c*, and the subcomponents 83*a* are configured to be inserted into holes 50 which extend through the thinner halves of the first components 81*a-c*. In the particular example, the diameters of the shafts of the subcomponents 83*a*, 83*b* and the holes 50 are sized such that the subcomponents 83*a*, 83*b* are able to freely slide within the holes 50, to facilitate insertion of the subcomponents 83*a*, 83*b*. Retention of the subcomponents 83*a*, 83*b* is achieved as a result of embedding the projections of the subcomponents 83*a*, 83*b* into the second component 82, as will be explained below.

To form a first bond between a given one of the first components 81*a-c* and the second component 82, the first component 81*a-c* is arranged on the second component 82, in its final joined position, whilst the second component 82 is in an uncured or semi-cured state. This stage of the process is shown in FIG. 8*b*. The desired relative positions of the first component 81*a-c* and the second component 82 may be maintained, for example, using jigs or any other suitable mechanism. The projections are then provided on the first component 81*a-c* by inserting the subcomponents 83*a*, 83*b* into the appropriate holes 50 of the first component 81*a-c* (that is, the two shorter subcomponents 83*a* are inserted into the holes 50 in the thinner half of the first component 81*a-c* and the two longer subcomponents 83*b* are inserted into the holes 50 in the thicker half).

As part of the same insertion process, the projections on the subcomponents 83*a*, 83*b* become embedded in the second component 82. In particular, the subcomponents 83*a*, 83*b* are inserted into the holes 50 with sufficient force that the projections penetrate the uncured or semi-cured composite material of the second component 82. The degree of force required will typically be low, due to the relatively soft state of the uncured or semi-cured composite material, meaning that the subcomponents 83*a*, 83*b* can be pressed into the holes 50 manually. The second component 82 is then cured, with the first components 81*a-c* arranged on it in the final joined positions as shown in FIGS. 8*b* and 8*c*. During the curing process the second component 82 and the first components 81*a-c* are heated to a temperature appropriate for curing the particular type of composite material from which the second component 82 is formed. Due to the different materials of the first components 81*a-c* (metal) and the second component 82 (composite) the first components 81*a-c* experience a different amount of thermal expansion to the corresponding regions of the second component 82 to which they are attached. However; for components of the sizes and materials typically used for aerospace applications the difference in thermal expansion is expected to be sufficiently small that no excessive strain is experienced by either the first components 81a-c or the second component 82 as a result of the curing process.

Figure 8D:
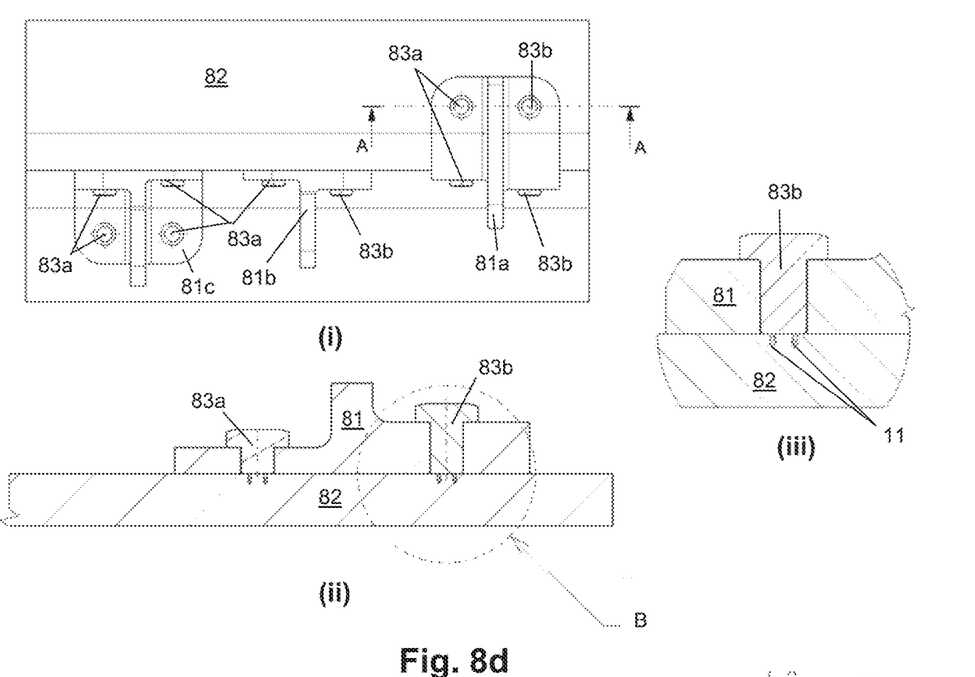

As a result of the curing of the second component 82, the projections on the subcomponents 83a, 83b become securely embedded in the second component 82, creating a first bond between each of the first components 81a-c and the second component 82. FIG. 8c shows the second component 82 with each of the first components 81a-c fixed to it by a first bond. FIG. 8c thus shows the state of the first and second components 81a-c, 82 upon completion of block 701. FIG. 8d provides further views of this state, in which the embedding of the projections into the second component 82 can be seen. Part (ii) is a cross-section along the line A-A in part (i), and part (iii) is an enlargement of the region B in part (ii).

Figure 8E:
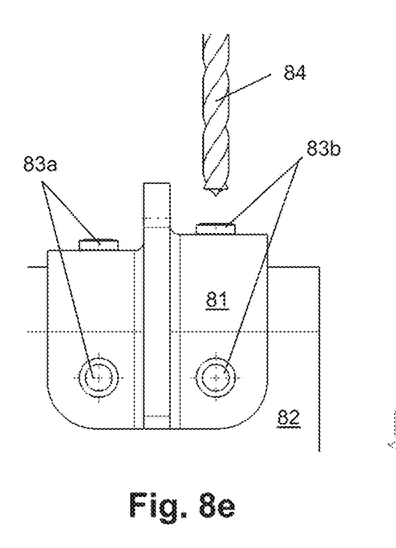
Figure 8F:
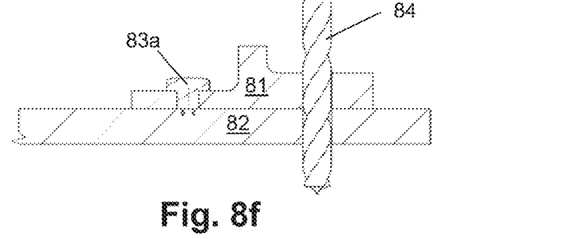

In a subsequent block 702, a fastener hole is created which passes through the first component and the second component and which encompasses at least some of the projections. The fastener hole may have any of the features described above in relation to the examples of FIGS. 1 to 5. In the particular example illustrated by FIGS. 8a-g, a first fastener hole is created at the location of one of the longer subcomponents 83b (although equally, the first fastener hole could be created at the location of one of the shorter subcomponents 83a). The fastener hole is created by drilling with a drill bit 84, which in the particular example has a diameter equal to the diameter of the head of the subcomponent 83b. In other examples the drill bit 84 may have a diameter less than or greater than the diameter of the head of the subcomponent 83b. However; the diameter of the drill bit 84 may generally be greater than or equal to the diameter of the shaft of the subcomponent being drilled out. In the illustrated example, the fastener hole encompasses the whole of the subcomponent 83b, which is thus entirely removed by the creation of the fastener hole. In examples in which the drill bit 84 has a smaller diameter than the subcomponent head, a ring of material corresponding to the peripheral part of the head will not be destroyed by the drilling. In such examples the ring of material will not be attached to the joined part, and can be removed along with or after the removal of the drill bit 84 from the newly created fastener hole. The state of an example first component 81 and the second component 82 just prior to and during the fastener hole creation process is shown by FIGS. 8e and 8f.

Figure 8G:
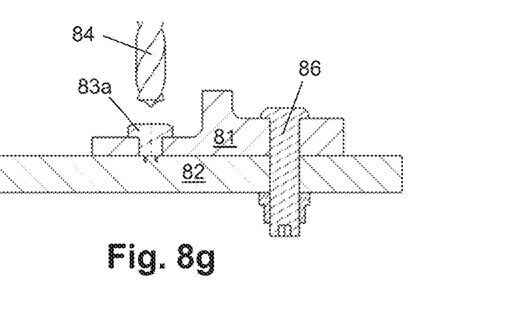

In block 703, a second bond is formed between the first component and the second component by installing a fastener in the fastener hole (that is, the fastener hole created during the performance of block 702). The fastener and its manner of installation may have any of the features described above in relation to the examples of FIGS. 1 to 5. In the particular example illustrated by FIGS. 8a-g, forming the second bond involves inserting the bolt of a nut-and-bolt type fastener 86 into the fastener hole created in block 703 such that the bolt passes through the example first component 81 and through the second component 82 and a tail-end of the bolt protrudes from a surface of the second component 82 (although this could be done the other way round, such that the tail-end of the bolt protrudes from a surface of the first component 81). The bolt is then secured in place, to enable it to retain the first component 81 and the second component 82 in the joined configuration, by tightening a nut part of the fastener 86. In some examples the nut may be captive, or integrated with the second component 82, in which case tightening the nut can be achieved by rotating the bolt part of the fastener during or after its insertion into the fastener hole. FIG. 8g shows the state of the first component 81 and the second component 82 upon completion of block 703. In this state the first and second components 81, 82 are held together by a first bond (effected by the embedded projections) and by a second bond (effected by the fastener).

The method 700 further comprises optional blocks 704 and 705, which are not essential to the invention, but may provide advantages for certain implementations.

In block 704 a further fastener hole is created which passes through the first component and the second component and which encompasses at least some of the projections not encompassed by the fastener hole (that is, the fastener hole created in block 702). The further fastener hole may be of the same size and configuration as the fastener hole, or it may be different (depending on whether a fastener to be installed in the further fastener hole has the same configuration as the fastener installed in block 703). Block 704 may be performed in substantially the same manner as block 702. During the performance of block 704 the first and second components are held together by the second bond formed by the fastener installed in block 703. In some examples the first and second components may additionally be held together by a first bond, formed by embedded projections at a location different to the location of the first fastener and different to the intended location of the further fastener.

In the particular example illustrated by FIGS. 8a-g, the further fastener hole may be created at the location of any of the remaining three subcomponents 83a, 83b (that is, the subcomponents 83a, 83b not removed by the creation of the first fastener hole). The further fastener hole is created by the same drill bit 84, and has the same diameter as the first fastener hole (although this need not be the case in other examples). FIG. 8g shows a further fastener hole about to be drilled at the location of one of the shorter subcomponents 83a. In this example the further fastener hole has a shorter axial length than the first fastener hole, because the further fastener hole extends through the thinner half of the first component 81 and the first fastener hole extends through the thicker half.

In block 705 a further fastener is installed in the further fastener hole. The further fastener may have any of the features described above in relation to the examples of FIGS. 1 to 5. The further fastener may be (but need not be) of the same configuration as the fastener (that is the fastener installed in block 703). Block 705 may be performed in the same manner as block 703. In the example of FIGS. 8a-g, the bolt of the further fastener (not shown) has a shorter stem than the bolt of the first fastener 86 (at least when the further fastener has been fully installed), corresponding to the shorter axial length of the further fastener hole. However; the installation process for the further fastener is the same as that for the first fastener 86, described above. It will be appreciated that in examples in which the further fastener is of a different type to the first fastener 86, the installation process for the further fastener may differ from that for the first fastener 86.

Optional blocks 704 and 705 may be repeated until all fasteners intended to be used to join the first and second components have been installed. For example, for each of the example first components 81a-c of FIGS. 8a-g, blocks 704 and 705 may be performed a total of three times, since each first component 81a-c is intended to be joined to the second component 82 by four fasteners.

Completion of the method 700 may result in a final joined part, which is ready to be put into operation. However; in some examples further processing steps (including further joining or bonding related steps) may be applied to the first and second components before it is ready for use. In some examples, upon completion of the method 700 all projections on the first component will have been removed, such that there are no projections present in the joined part. However; other examples are possible in which some projections remain in the joined part. Such projections may be at locations which do not correspond to the location of any fastener used to join the first and second components. In some such examples, the projections remain present in the final joined part when the joined part becomes operational, and over its subsequent operational lifetime. In some examples, at least some of the remaining projections may be at locations intended to be removed by a further processing step that is to be applied to the joined part. In some examples, upon completion of the method 700 all subcomponents comprised in the first component will have been removed, such that no subcomponents or parts thereof are present in the joined part. However; other examples are possible in which some subcomponents remain in the joined part. Such subcomponents may be at locations which do not correspond to the location of any fastener used to join the first and second components. In some examples, at least some of the remaining subcomponents may be at locations intended to be removed by a further processing step that is to be applied to the joined part.

Although the invention has been described above with reference to one or more preferred examples or embodiments, it will be appreciated that various changes or modifications may be made without departing from the scope of the invention as defined in the appended claims.

Where the term "or" has been used in the preceding description, this term should be understood to mean "and/or", except where explicitly stated otherwise.

The invention claimed is:

1. A method for joining a first component and a second component, the method comprising:
    forming a first bond between the first component and the second component by providing a plurality of projections on the first component and embedding the plurality of projections in the second component;
    creating a fastener hole which passes through the first component and the second component and which encompasses at least one of the projections; and
    forming a second bond between the first component and the second component by installing a fastener in the fastener hole,
    wherein the plurality of projections comprises a first array of one or more projections provided on a first region of the first component and a second array of one or more projections provided on a second region of the first component, and
    wherein the fastener hole encompasses the first array of one or more projections, such that the first array of one or more projections is entirely removed by the creation of the fastener hole.

2. The method of claim 1, wherein a location of each of the first region and the second region corresponds to an intended fastener location for fastening the first component to the second component.

3. The method of claim 1, further comprising creating a further fastener hole which passes through the first component and the second component and which encompasses at least some of the projections not encompassed by the fastener hole, wherein a second bond is formed additionally by installing a further fastener into the further fastener hole.

4. The method of claim 3, wherein the further fastener hole encompasses the second array of one or more projections, such that the second array of one or more projections is entirely removed by the creation of the further fastener hole.

5. The method of claim 1, wherein the fastener hole is a pilot hole having a diameter smaller than the diameter of a final fastener hole intended to be created at the same location as the pilot hole, and wherein the fastener is a temporary fastener.

6. The method of claim 1, wherein the second component comprises a composite material, and wherein embedding the plurality of projections into the second component comprises penetrating the plurality of projections into the second component in a pre-cured state of the second component, and subsequently curing the second component.

7. The method of claim 1, wherein the at least one projection encompassed by the fastener hole is comprised in a subcomponent, and wherein providing a plurality of projections on the first component comprises arranging the subcomponent on the first component.

8. The method of claim 7, wherein the fastener hole encompasses the subcomponent, such that the subcomponent is entirely removed by the creation of the fastener hole.

9. The method of claim 7, wherein the subcomponent comprises a head and a shaft, wherein the at least one projection is on an end of the shaft distal from the head, and wherein when the subcomponent is arranged on the first component the shaft extends through a hole in the first component such that the head is adjacent one side of the hole and the at least one projection extends from an opposite side of the hole.

10. The method of claim 9, wherein forming the first bond between the first component and the second component comprises:
    arranging the second component adjacent to the hole in the first component; and
    inserting the shaft of the subcomponent into the hole in the first component such that the at least one projection on the subcomponent penetrates the second component.

11. The method of claim 7, wherein the subcomponent is formed by an additive manufacturing process and the first component is not formed by an additive manufacturing process.

12. The method of claim 1, wherein the plurality of projections is formed by an additive manufacturing process.

13. The method of claim 1, wherein the first and second components are aircraft components.

* * * * *